(12) United States Patent
Yang et al.

(10) Patent No.: US 11,675,248 B2
(45) Date of Patent: Jun. 13, 2023

(54) OPTICAL ELEMENT DRIVING MECHANISM

(71) Applicant: TDK TAIWAN CORP., Taoyuan (TW)

(72) Inventors: Yung-Ping Yang, Taoyuan (TW); Shao-Chung Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 524 days.

(21) Appl. No.: 16/779,172

(22) Filed: Jan. 31, 2020

(65) Prior Publication Data

US 2020/0249493 A1 Aug. 6, 2020

Related U.S. Application Data

(60) Provisional application No. 62/799,886, filed on Feb. 1, 2019.

(51) Int. Cl.

| | | |
|---|---|---|
| *G02B 7/08* | (2021.01) | |
| *G03B 9/06* | (2021.01) | |
| *G02B 7/09* | (2021.01) | |
| *G02B 27/64* | (2006.01) | |
| *G03B 13/36* | (2021.01) | |
| *G03B 5/06* | (2021.01) | |
| *G03B 30/00* | (2021.01) | |
| *H04N 23/57* | (2023.01) | |
| *H04N 23/68* | (2023.01) | |

(52) U.S. Cl.
CPC ............ *G02B 7/08* (2013.01); *G03B 9/06* (2013.01); *G02B 7/09* (2013.01); *G02B 27/646* (2013.01); *G03B 5/06* (2013.01); *G03B 13/36* (2013.01); *G03B 30/00* (2021.01); *G03B 2205/0023* (2013.01); *G03B 2205/0069* (2013.01); *H04N 23/57* (2023.01); *H04N 23/687* (2023.01)

(58) Field of Classification Search
CPC . G02B 27/04; G02B 7/08; G02B 7/09; G02B 27/646; G02B 27/64; H04N 5/2257; H04N 5/23287; H04N 5/23248; H04N 5/23264; H04N 5/2328; G03B 9/06; G03B 5/06; G03B 13/36; G03B 2205/0023; G03B 2205/0069; G03B 2205/00; G03B 2205/0076; G03B 2217/005
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | | |
|---|---|---|---|---|
| 11,378,773 | B2 * | 7/2022 | Lee | ............. G02B 13/001 |
| 2020/0050014 | A1 * | 2/2020 | Park | ............. G03B 3/10 |
| 2021/0294067 | A1 * | 9/2021 | Park | ............. G03B 13/36 |

* cited by examiner

*Primary Examiner* — Arnel C Lavarias
(74) *Attorney, Agent, or Firm* — Muncy, Geissler, Olds & Lowe, P.C.

(57) ABSTRACT

An optical element driving mechanism is provided. The optical element driving mechanism includes a fixed part, a movable part, a driving assembly, and a sensing assembly. The movable part moves relative to the fixed part. The driving assembly drives the movable part to move relative to the fixed part. The sensing assembly senses the movement of the movable part.

18 Claims, 7 Drawing Sheets

OPTICAL ELEMENT DRIVING MECHANISM

CROSS-REFERENCE TO RELATED APPLICATIONS

This application claims the benefit of U.S. Provisional Application No. 62/799,886, filed on Feb. 1, 2019, the entirety of which is incorporated by reference herein.

BACKGROUND OF THE INVENTION

Field of the Invention

The present invention relates to a driving mechanism, and, in particular, to an optical element driving mechanism.

Description of the Related Art

As technology has developed, optical elements and optical element driving mechanisms, which are used for driving optical elements, have been miniaturized. Many electronic devices (such as tablet computers and smartphones) are equipped with at least one optical element, at least one optical element driving mechanism, and at least one light-detection element for capturing images and recording videos.

When a user uses an electronic device, shock or vibration may occur, and this may cause the images or videos to come out blurry. An optical element driving mechanism that is able to perform displacement-correction and shake-compensation has been developed to meet the increasing demand for higher quality images and videos.

The optical element driving mechanism may drive the optical element to move along a direction that is parallel with the optical axis to autofocus (AF) on the scene being shot. Additionally, the optical element driving mechanism may also drive the optical element to move along a direction that is perpendicular to the optical axis to achieve optical image stabilization (OIS) to compensate for a deviation in the imaged image caused by shaking or being impacted, and to solve the problem of blurry images and videos. AF and OIS may enhance the image quality.

Nowadays, an optical element driving mechanism may also include a sensing assembly to achieve closed-loop feedback. Therefore, the configuration and design of the sensing assembly are important.

BRIEF SUMMARY OF THE INVENTION

An embodiment of the present invention provides an optical element driving mechanism. The optical element driving mechanism includes a fixed part, a movable part, a driving assembly, and a sensing assembly. The movable part moves relative to the fixed part. The driving assembly drives the movable part to move relative to the fixed part. The sensing assembly senses the movement of the movable part.

According to some embodiments, the optical element driving mechanism further includes a main axis. The movable part includes a frame and a holder. The frame and the holder are arranged along the main axis. The holder includes an electrical connection portion electrically connected to the driving assembly. The sensing assembly includes a sensing element and a reference element. The sensing element is disposed on the frame and the reference element is disposed on the holder. The sensing element senses a movement of the holder relative to the frame. When viewed along the main axis, the sensing element at least partially overlaps the reference element.

According to some embodiments, the optical element driving mechanism further includes a damping element. The damping element may be disposed between the frame and the fixed part, between the holder and the frame, or between the sensing element and the fixed part. The fixed part and the sensing element are located a distance apart. The fixed part includes a recess corresponding to the sensing element. When viewed along the main axis, a profile of the frame is polygonal and the sensing element is disposed on a corner or a side of the frame. The sensing assembly further includes at least another sensing element disposed on the fixed part for sensing a movement of the movable part relative to the fixed part.

According to some embodiments, the optical element driving mechanism further includes a stopping assembly or a plurality of stopping assemblies close to the sensing element to prevent the sensing element from contacting the fixed part. The stopping assembly is disposed on the fixed part of the frame. The sensing element is disposed between the stopping assemblies. The movable part further includes a circuit assembly disposed on the frame. A portion of the circuit assembly is revealed from the frame. The circuit assembly is three-dimensional. The sensing element is electrically connected to the revealed portion of the circuit assembly.

According to some embodiments, the movable part further includes a first elastic element connecting the frame and the holder, and the sensing element is electrically connected to the driving assembly via the first elastic element. When viewed in a direction that is perpendicular to the main axis, the first elastic element at least partially overlaps the sensing element. The movable part further includes another elastic element connecting the first elastic element and the holder. The fixed part further includes an external electrical connection portion. The sensing element is electrically connected to the external electrical connection portion via the circuit assembly and the another elastic element.

BRIEF DESCRIPTION OF THE DRAWINGS

The present invention can be more fully understood by reading the subsequent detailed description and examples with references made to the accompanying drawings.

DETAILED DESCRIPTION OF THE INVENTION

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of the present disclosure will be described with reference to the drawings.

Figure 1:
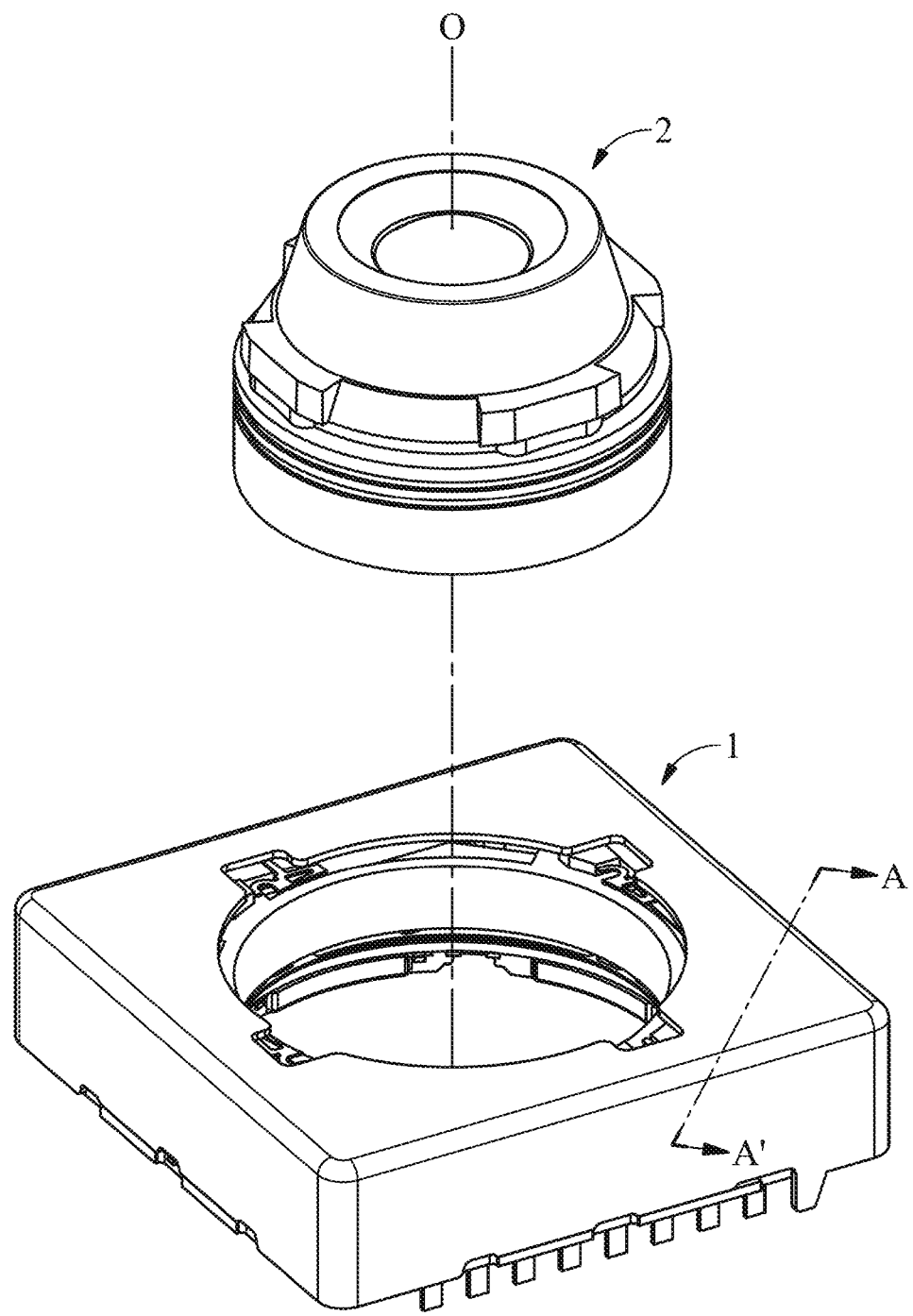
FIG. 1 is a perspective view of an optical element driving mechanism and an optical element according to some embodiments of the present disclosure.
Figure 2:
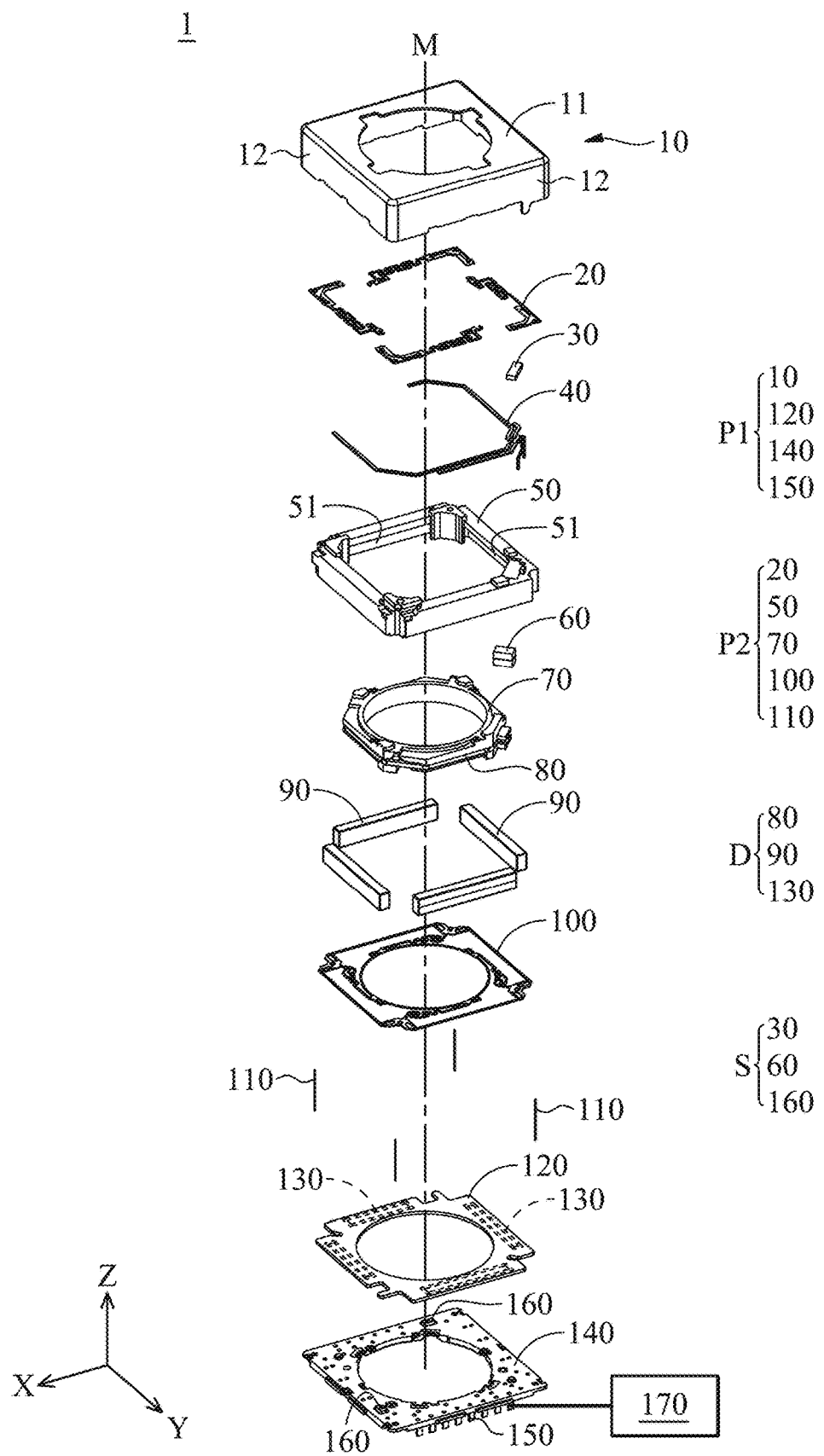
FIG. 2 is an exploded view of the optical element driving mechanism of FIG. 1.

First, please refer to FIG. 1 and FIG. 2. FIG. 1 is a perspective view of an optical element driving mechanism 1 and an optical element 2 according to some embodiments of the present disclosure. The optical element 2 has an optical axis O. The optical axis O is a virtual axis passing through the center of the optical element 2. FIG. 2 is an exploded view of the optical element driving mechanism 1 of FIG. 1

The optical element driving mechanism 1 includes a fixed part P1, a movable part P2, a sensing assembly S, and a driving assembly D. The movable part P2 is used for holding the optical element 2. The movable part P2 is movably connected to the fixed part P1, and thus the movable part P2 may move relative to the fixed part P1. The driving assembly D may drive the movable part P2 to move relative to the fixed part P1. The sensing assembly S senses the movement of the movable part P2 relative to the fixed part P1.

As shown in FIG. 2, the fixed part P1 includes a case 10, a circuit board 120, a bottom 140, and an external electrical connection portion 150. The movable part P2 includes four first elastic elements 20, a frame 50, a holder 70, a second elastic element 100, and four third elastic elements 110. The driving assembly D includes an AF coil 80, four magnetic elements 90 and four OIS coils 130. The sensing assembly S includes an AF sensing element 30, a reference element 60 and two OIS sensing elements 160. The elements may be added or omitted according to users' needs.

The fixed part P1 has a main axis M. The main axis M is a virtual axis passing through the center of the fixed part P1. When the optical element driving mechanism 1, the optical element 2, and a photosensitive element (not shown) (e.g. charge-coupled detector, CCD) are aligned, the optical axis O of the optical element 2 coincides the main axis M of the fixed parts P1.

The case 10, the circuit board 120, and the bottom 140 of the fixed part P1 are sequentially arranged along the main axis M. The case 10 includes a top wall 11 and four sidewalls 12. The top wall 11 is perpendicular to the main axis M. The sidewall 12 extends from an edge of the top wall 11 along a direction that is parallel with the main axis M. The case 10 is located above the circuit board 120 and the bottom 140, the sidewall 12 of the case 10 may be connected to the bottom 140 by soldering or welding, etc. The movable part P2, the sensing assembly S, and the driving assembly D, etc. may be accommodated in the space formed by the connection of the case 10 and the bottom 140 therein.

The case 10 is made of metal or non-metal material. The case 10 may be made of a material with magnetic permeability, such as ferromagnetic material, including iron (Fe), nickel (Ni), cobalt (Co), or an alloy thereof, for focusing and strengthening the magnetic force generated by the driving assembly D.

The circuit board 120 is disposed above the bottom 140. The circuit board 120 may be a flexible printed circuit (FPC) or a flexible-hard composite board. The circuit board 120 may be provided with electronic elements such as a capacitor, a resistor or an inductor. The bottom 140 is provided with circuits (not shown), and the circuits are formed by insert molding in the bottom 140.

The current is supplied to the optical element driving mechanism 1 through the external electrical connection portion 150. The external electrical connection portion 150 may be connected to a power supply source (not shown) outside the optical element driving mechanism 1. The external electrical connection portion 150 includes several pins for the current to flow in or flow out. The direction of the current is determined according to the direction of movement of the movable part P2 (for example, away from the bottom 140 or toward the bottom 140).

The first elastic element 20, the frame 50, the holder 70, and the second elastic element 100 of the movable part P2 are sequentially arranged along the main axis M. The frame 50 is made of a nonconductive material or a magnetically permeable material, such as plastic or metal alloy. When the frame 50 is made of magnetically permeable material, the frame 50 may similarly have the functions of maintaining magnetic force and enhancing magnetic force. Additionally, the frame 50 made of magnetically permeable material may have a higher structural strength than non-conductive material.

The outline of the frame 50 is a polygonal, such as a rectangle or a square. The frame 50 has four receiving holes 51 to receive the magnetic elements 90 and protect the magnetic elements 90. The frame 50 includes a circuit assembly 40. The circuit assembly 40 is formed inside the frame 50 by insert molding. The circuit assembly 40 has a three-dimensional structure and includes different pins that may be respectively used as a positive electrode and a negative electrode.

The holder 70 is hollow for holding the optical element 2. The holder 70 and the optical element 2 may be provided with corresponding screw structures so that the optical element 2 is fixed to the holder 70 better.

The first elastic element 20 and the second elastic element 100 of the movable part P2 are made of an elastic material or a ductile material, such as metal. In the art, the first elastic element 20 and the second elastic element 100 may be known as terms "spring", "spring leaf", "plate spring leaf", etc.

The first elastic element 20 connects to a portion of the frame 50 and the top surface of the holder 70 and the second elastic element 100 connects to a portion of the frame 50 and the bottom surface of the holder 70 in order to elastically clamp the holder 70. When the movable part P2 moves relative to the fixed part P1, such elastic clamping by the first elastic element 20 and the second elastic element 100 may limit the movement range of the holder 70 and prevent the holder 70 and the optical element 2 therein from being damaged because of the collision between the holder 70 and the case 10 or the bottom 140 when the optical element driving mechanism 1 moves or is affected by an external force.

The upper ends of the four third elastic elements 110 are respectively connected to the four first elastic elements 20 of the movable part P2, and the lower ends of the four third elastic elements 110 are connected to the four corners of the bottom 140 of the fixed part P1. As shown in FIG. 2, the four corners of the second elastic element 100 and the four corners of the circuit board 120 contract inwardly to provide space for the third elastic element 110.

As described above, the first elastic element 20 is connected to the frame 50 of the movable part P2 and the holder 70 of the movable part P2. Therefore, the third elastic element 110 essentially "suspends" the frame 50 together with the holder 70 of the movable part P2 between the case 10 and the bottom 140 of the fixed part P1, so that the frame 50 and the holder 70 are both separated by a distance apart from the case 10 and the bottom 140. That is, the frame 50 and the holder 70 are not in direct contact with the case 10 and the bottom 140. With the flexible third elastic element 110, the movement of the frame 50 of the movable part P2 and the holder 70 of the movable part P2 relative to the case 10 of the fixed part P1 and the bottom 140 of the fixed part P1 are mostly two-dimensional in directions that are perpendicular to the optical axis O.

Both the first elastic element 20 and the third elastic element 110 are electrically connected to the driving assembly D. The driving assembly D may drive the optical element 2 to move or rotate. Specifically, the holder 70 together with the optical element 2 therein may move relative to the frame 50 in a direction that is parallel with the optical axis O. Therefore, the movement of the holder 70 together with the optical element 2 relative to the frame 50 may achieve autofocus (AF) basically. As described above, the movement of the frame 50 together with the holder 70 therein relative to the bottom 140 are mostly two-dimensional in directions that are perpendicular to the optical axis O. Therefore, the movement of the frame 50 together with the holder 70 relative to the bottom 140 may achieve optical image stabilization (OIS) basically. In other words, the holder 70 is movably connected to the frame 50, and the frame 50 is movably connected to the fixed part P1.

How the driving assembly D achieves autofocus (AF) and optical image stabilization (OIS) will be explained in detail. The AF coil 80 is polygonal, surrounding the holder 70. The OIS coil 130 is disposed in the circuit board 120. The magnetic element 90 may be a multi-pole magnet or multiple glued magnets. Each pair of magnetic poles (one pair of N-pole, S-pole) of the magnetic element 90 are arranged along a direction that is perpendicular to the main axis M. The four magnetic elements 90 correspond to the AF coil 80 and the four OIS coils 130 at the same time. In this embodiment, since there is no need for providing two sets of magnetic elements to achieve autofocus (AF) and optical image stabilization (OIS) respectively and only one set of the magnetic elements 90 is needed to achieve autofocus (AF) and optical image stabilization (OIS) at the same time, the volume of the optical element driving mechanism 1 may be reduced and miniaturization is achieved.

When a current is supplied to the driving assembly D, the magnetic force generated between the AF coil 80 and the magnetic elements 90 is parallel with the optical axis O for driving the holder 70 and the optical element 2 therein to move along a direction that is parallel with the optical axis O so as to achieve autofocus (AF).

When a current is supplied to the driving assembly D, the magnetic force generated between the OIS coils 130 and the magnetic elements 90 is perpendicular to the optical axis O for driving the frame 50, the holder 70 and the optical element 2 therein to move along a direction that is perpendicular to the optical axis O so as to achieve optical image stabilization (OIS).

The AF sensing element 30 of the sensing assembly S is disposed on the frame 50 and the OIS sensing element 160 of the sensing assembly S is disposed on the bottom 140. The AF sensing element 30 may sense the movement of the holder 70 relative to the frame 50 along a direction that is parallel with the optical axis O. The OIS sensing element 160 may sense the movement of the holder 70 relative to the bottom 140 along a direction that is perpendicular to the optical axis O. In this embodiment, the sensing assembly S includes two OIS sensing elements 160 for sensing the movement of the holder 70 relative to the bottom 140 along the X-axis and along the Y-axis, respectively.

In general, the AF sensing element 30 may be a Hall sensor, a giant magnetoresistive (GMR) sensor, a tunneling magnetoresistive (TMR) sensor, etc. A Hall sensor, a GMR sensor, or a TMR sensor means that other elements such as an amplifier circuit, a temperature-compensation circuit, and a power voltage-stabilization circuit are integrated into the sensor in addition to the Hall element, the GMR element, and the TMR element. Such a sensor is referred to as an All-in-One integrated circuit (All-in-One IC). After current is supplied to an All-in-One IC, the All-in-One IC may supply the current to the other elements. Additionally, the All-in-One IC has the ability to control other elements. As for the OIS sensing element 160, it is a Hall element, a GMR element, a TMR element, etc., to which a current has to be supplied and it may not supply the current to the other elements nor have the ability to control other elements.

The description related to the AF sensing element 30 and the OIS sensing element 160 is provided to illustrate the difference between a Hall sensor/a GMR sensor/a TMR sensor and a Hall element/a GMR element/a TMR element, and it is not limited thereto. For example, the AF sensing element 30 may be a Hall element and the OIS sensing element 160 may be an All-in-One IC.

The reference element 60 is disposed on the holder 70. The reference element 60 may be a magnetic element, such as a magnet. When the holder 70 moves, the adjacent reference element 60 also moves with the holder 70, and thus the magnetic field of the reference element 60 changes accordingly. The change of the magnetic field of the reference element 60 may be detected by the AF sensing element 30, and thus the movement of the holder 70 along a direction that is parallel with the optical axis O may be obtained.

The change of the magnetic field of the reference element 60 may be converted to signals through the AF sensing element 30. The signals may be output to a control unit 170 (e.g. a central processing unit (CPU)) outside the optical element driving mechanism 1 or processed internally by the AF sensing element 30, and thus the position of the holder 70 is obtained. In order to correct the position of the holder 70, the signal is input to the AF sensing element 30 by the control unit 170. Alternatively, the position of the holder 70 may be adjusted directly by the AF sensing element 30 and the movement of the holder 70 may be controlled directly by the AF sensing element 30.

The AF sensing element 30 includes six pins. Two pins are used for power input to provide current for the AF sensing element 30. Two pins are used for signal input and output, inputting signals from the control unit 170 and outputting signals to the control unit 170. Two pins are used for power supply to provide current to the AF coil 80 of the driving assembly D to achieve autofocus function. In other words, among the six pins of the AF sensing element 30, four pins are electrically connected to elements outside the optical element driving mechanism 1, and two pins are electrically connected to the elements (the AF coil 80 in this embodiment) inside the optical element driving mechanism 1.

Figure 3:
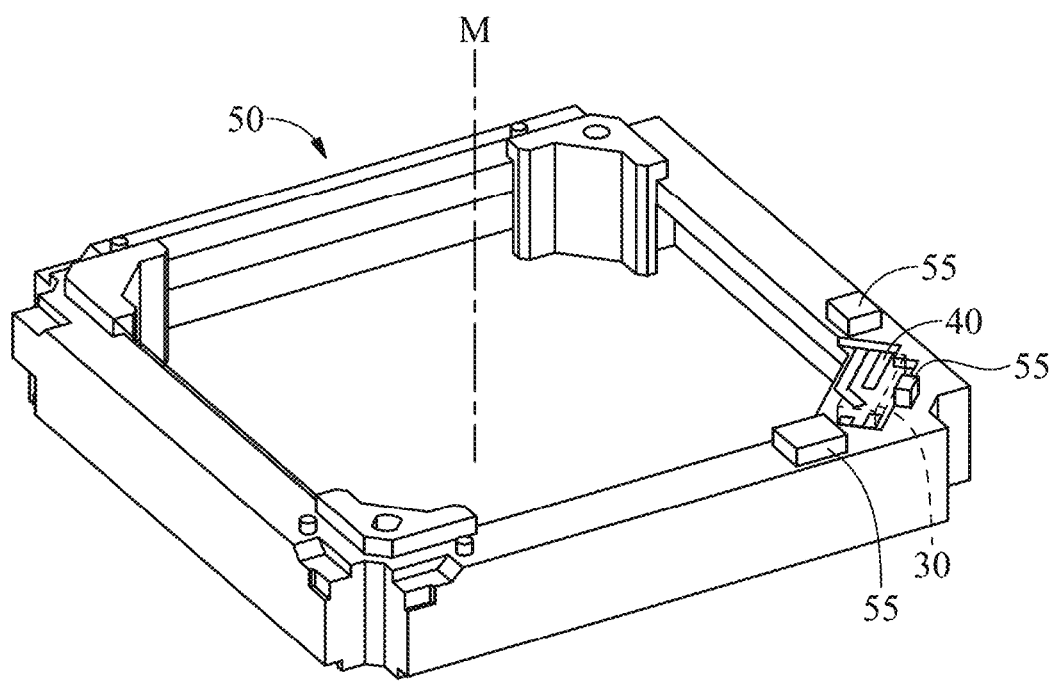
FIG. 3 is a schematic view of a frame provided with a circuit assembly.

FIG. 3 is a schematic view of the frame 50 provided with the circuit assembly 40. In FIG. 3, the AF sensing element 30 is illustrated in dotted lines. A portion of the circuit assembly 40 is embedded in the frame 50, and the other portions are revealed from the frame 50. As shown in FIG. 3, the AF sensing element 30 is electrically connected to the portion of the circuit assembly 40 revealed from the frame 50.

In order to protect the AF sensing element 30, the frame 50 further includes three stopping assemblies 55 disposed adjacent to the AF sensing element 30 to prevent the AF sensing element 30 from contacting the case 10. For example, the AF sensing element 30 may be disposed between the stopping assemblies 55. The stopping assemblies 55 protrude farther than the AF sensing element 30, i.e. the top surfaces of each of the stopping assemblies 55 are closer to the case 10 than the top surface of the AF sensing element 30. In some embodiments, the frame 50 may be located in an extreme position to contact the case 10, under such circumstances, the stopping assemblies 55 of the frame 50 contact the case 10 first, so the AF sensing element 30 does not contact the case 10 to prevent the AF sensing element 30 from being damaged. Optionally, the case 10 may also include one or more stopping assembly to prevent the AF sensing element 30 from contacting the case 10.

Figure 4:
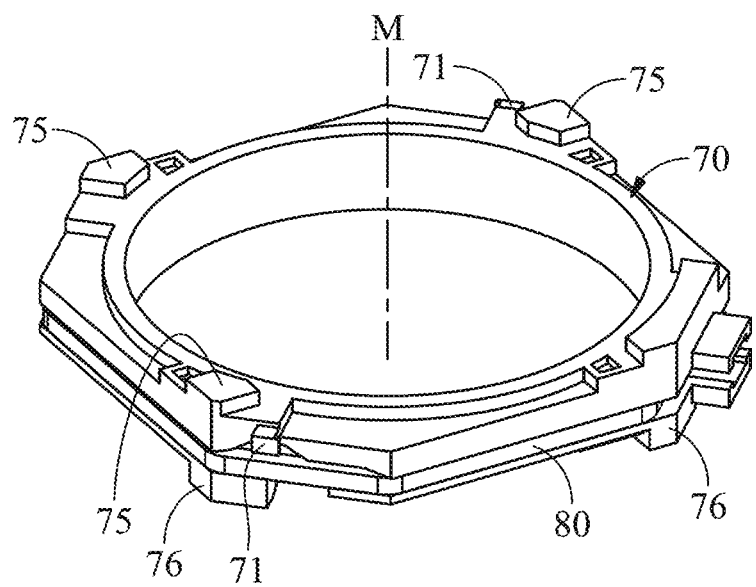
FIG. 4 is a perspective view of a holder and an AF coil.

FIG. 4 is a perspective view of the holder 70 and the AF coil 80. The holder 70 includes a plurality of upper stopping portions 75 and a plurality of lower stopping portions 76. When viewed in a direction that is perpendicular to the main axis M, the upper stopping portions 75 and the lower stopping portions 76 are located on different sides of the holder 70. The upper stopping portions 75 are closer to the light entrance than the lower stopping portions 76.

When the driving assembly D drives the holder 70 to move along a direction that is parallel with the optical axis O to an extreme position, the upper stopping portions 75 contact the case 10 or the lower stopping portions 76 contact the bottom 140. Therefore, the rest of the holder 70 will not contact the case 10 or the bottom 140 and the rest of the holder 70 may be prevented from colliding with the case 10 or the bottom 140. To sum up, the upper stopping portions 75 may restrict the movement of the holder 70 relative to the case 10 and the lower stopping portions 76 may restrict the movement of the holder 70 relative to the bottom 140.

It should be noted that the number and the positions of the stopping assemblies 55 of the frame 50, the upper stopping portions 75 and the lower stopping portions 76 of the holder 70 may be adjusted. For example, in order to effectively disperse the collision force and improve the overall stability of the optical element driving mechanism 1, three or more upper stopping portions 75 or lower stopping portions 76 may be provided, respectively.

In addition, as shown in FIG. 4, the holder 70 includes two electrical connection portions 71 disposed on two opposite sides of the holder 70 close to the light exit. The electrical connection portions 71 are used for electrically connected to the AF coil 80 of the driving assembly D. A portion of the AF coil 80 extends from the AF coil 80 and surrounds the electrical connection portions 71. By soldering on the electrical connection portions 71 and the like, the AF coil 80 may be electrically connected to other elements, e.g. the first elastic element 20.

In detail, the current flows into the optical element driving mechanism 1 starting from the external electrical connection portion 150. Then, the current flows through the circuit provided in the bottom 140, the third elastic element 110, the first elastic element 20, and the circuit assembly 40 in the frame 50 to supply power to the AF sensing element 30. As described above, in this embodiment, the AF sensing element 30 may supply power to other elements. The current supplied by the AF sensing element 30 flows through the first elastic element 20 and the electrical connection portions 71 to apply the current to the AF coil 80 of the driving assembly D. Therefore, the magnetic force may be generated between the AF coil 80 and the magnetic element 90, so that the holder 70 may move along a direction that is parallel with the optical axis O relative to the frame 50 to achieve autofocus (AF).

Figure 5:
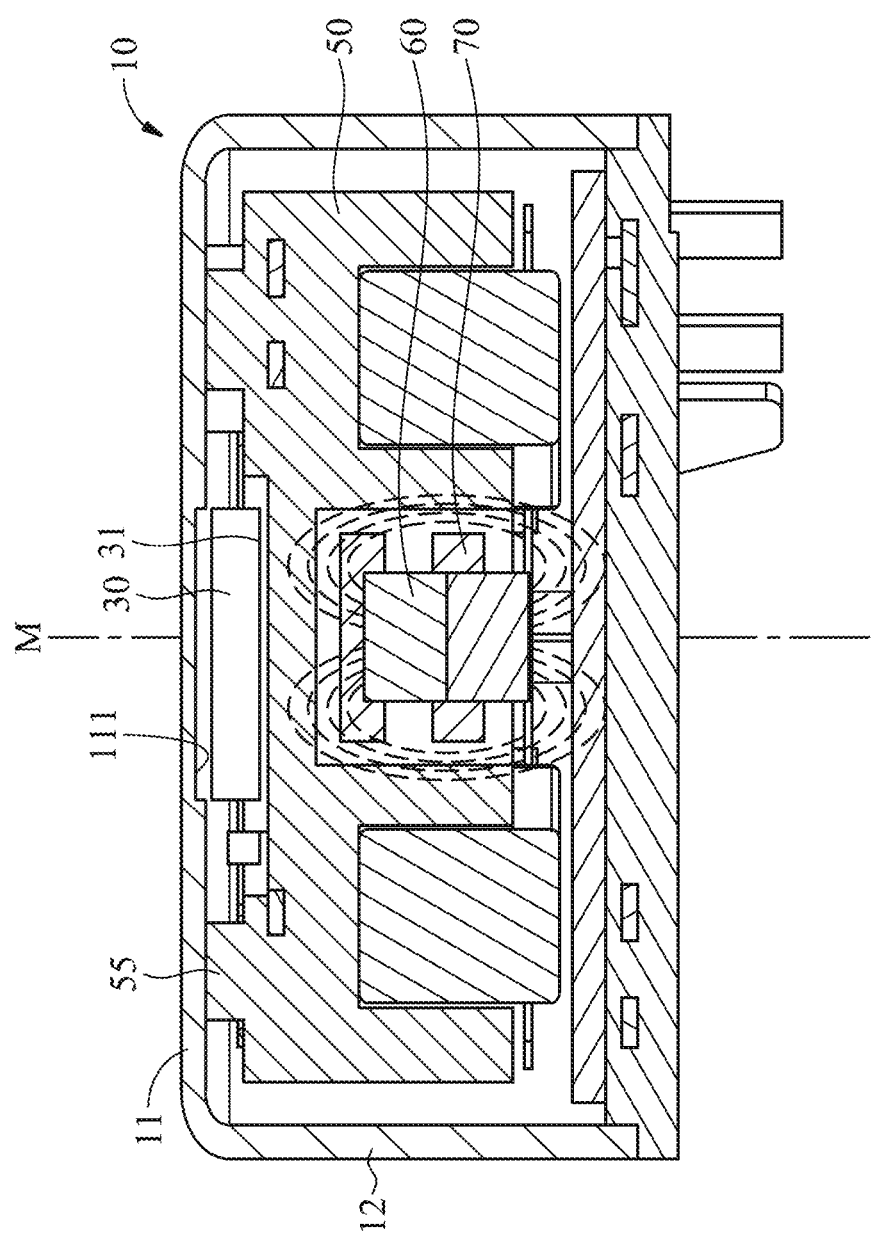
FIG. 5 is a cross-sectional view of the optical element driving mechanism along line A-A' of FIG. 1.

FIG. 5 is a cross-sectional view of the optical element driving mechanism 1 along line A-A' of FIG. 1 and FIG. 5 is used for clarifying the configuration of the AF sensing element 30 and the reference element 60. When viewed along the main axis M, the AF sensing element 30 at least partially overlaps the reference element 60. The top wall 11 of the case 10 includes a recess 111 corresponding to the AF sensing element 30. The AF sensing element 30 is disposed on the surface of the frame 50 that is perpendicular to the main axis M. As shown in FIG. 5, the case 10 and the AF sensing element 30 are located a distance apart.

The AF sensing element 30 includes a surface 31 corresponding to the reference element 60. When the holder 70 moves, the change of the magnetic lines of force of the reference element 60 may be sensed by the surface 31. In FIG. 5, the magnetic lines of force are shown in dashed lines. If there is no influence or interference, the magnetic lines of force are closed curves that are not intersected. When the holder 70 moves toward the top wall 11 of the case 10, the density of the magnetic lines of force from the reference element 60 sensed by the surface 31 increases. To the contrary, when the holder 70 moves away from the top wall 11 of the case 10, the density of the magnetic lines of force from the reference element 60 sensed by the surface 31 decreases. The change of the density of the magnetic lines of force from the reference element 60 is sensed by the AF sensing element 30, so the position of the reference element 60 may be known, thereby the position of the holder 70 may be known.

It should be noted that when the displacement correction of optical image stabilization is conducted, the frame 50 moves in a direction that is perpendicular to the optical axis O together with the holder 70 therein. Since the AF sensing element 30 is disposed on the frame 50 and the reference element 60 is disposed on the holder 70, the movement of the AF sensing element 30 in a direction that is perpendicular to the optical axis O (OIS) is substantially the same as that of the reference element 60. Therefore, the difference of the movement between the AF sensing element 30 and the reference element 60 is in a direction that is parallel with the optical axis O (AF). That is, when the AF sensing element 30 detects the change of the magnetic field of the reference element 60, the AF sensing element 30 may effectively detect the movement of the holder 70 in a direction parallel with the optical axis O (AF) instead of detecting the movement of the holder 70 in a direction that is perpendicular to the optical axis O (OIS).

Figure 6:
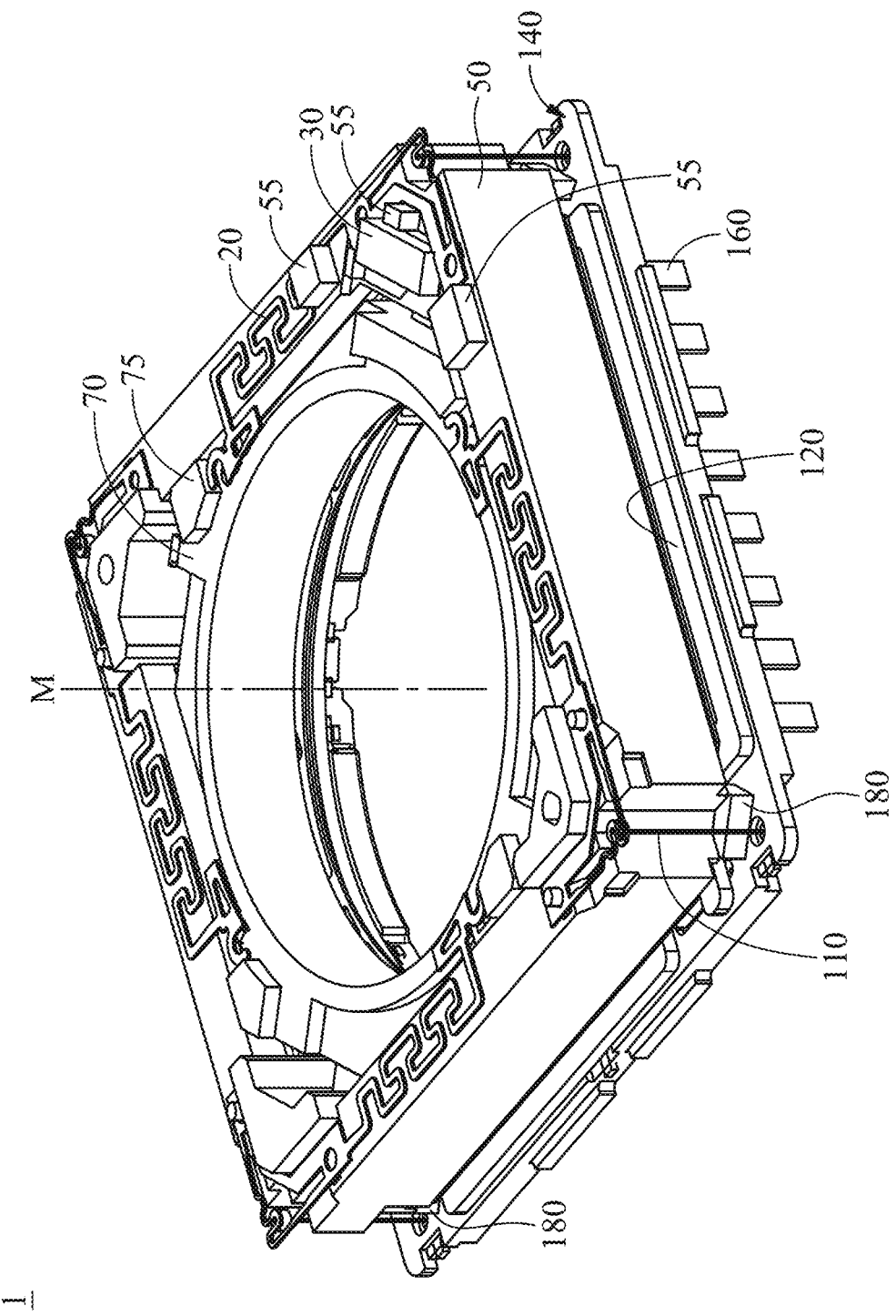
FIG. 6 is a perspective view of the optical element driving mechanism with the case omitted.
Figure 7:
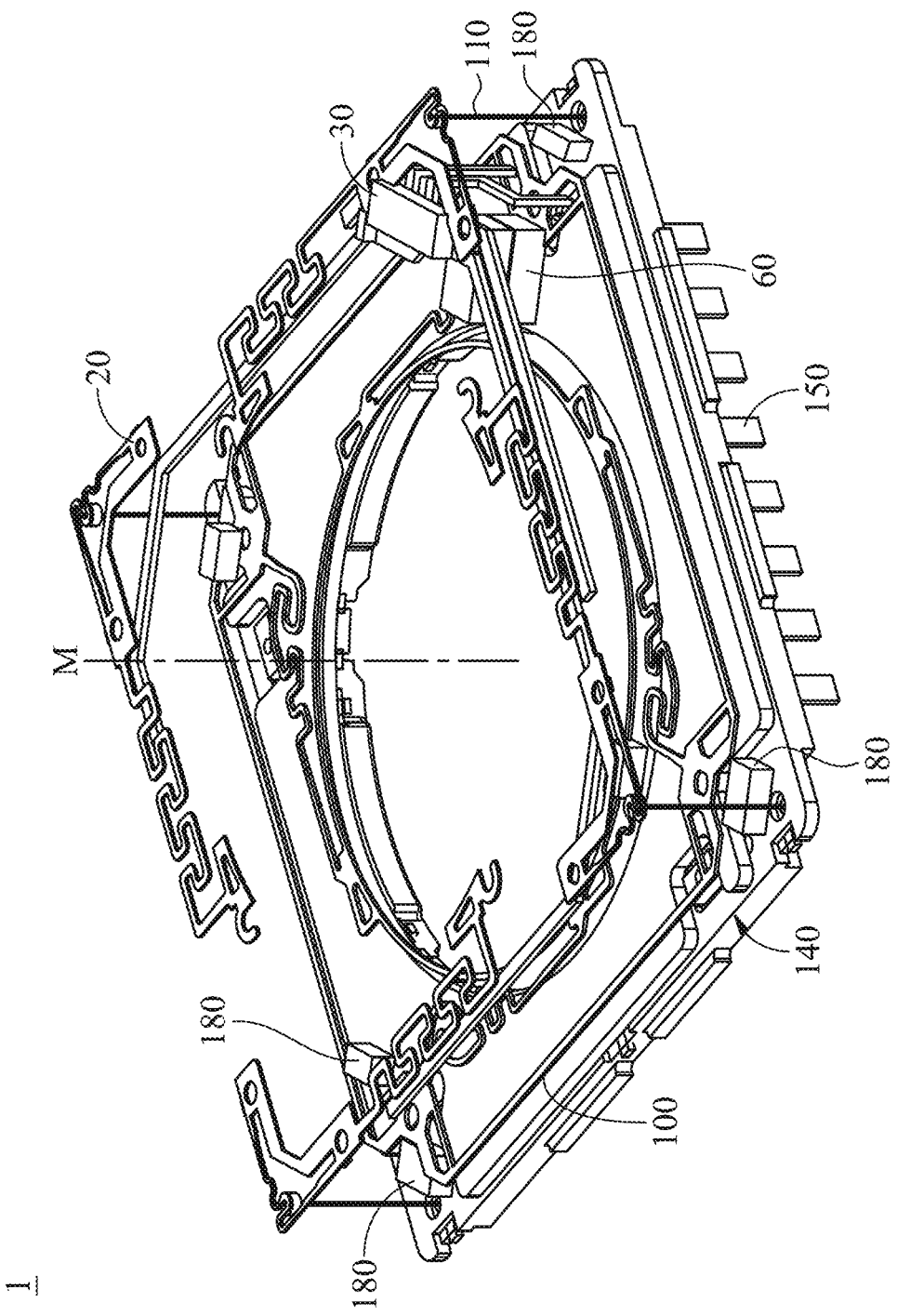
FIG. 7 is a perspective view of the optical element driving mechanism with the case, the frame, and the holder omitted.
Figure 8:
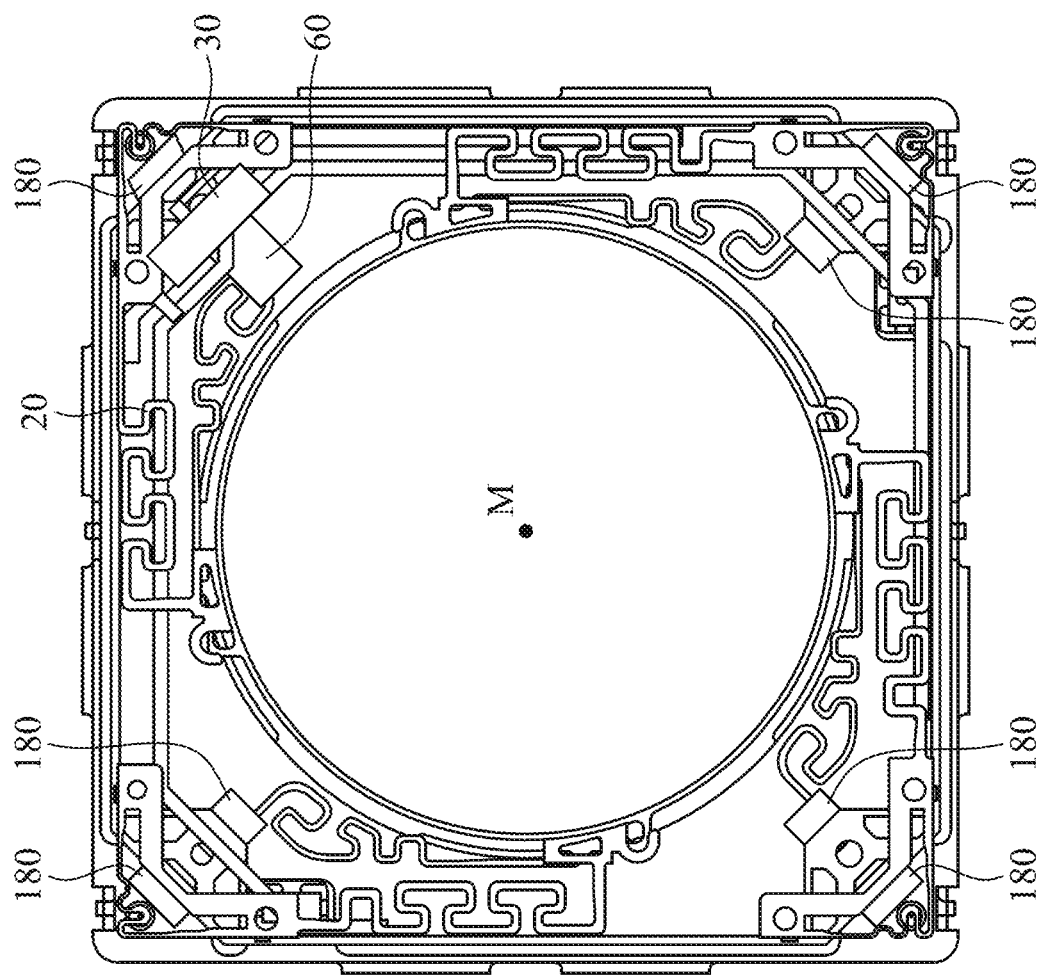
FIG. 8 is a top view of the optical element driving mechanism with the case, the frame, and the holder omitted.

FIG. 6 is a perspective view of the optical element driving mechanism 1 with the case 10 omitted. FIG. 7 is a perspective view of the optical element driving mechanism 1 with the case 10, the frame 50, and the holder 70 omitted. FIG. 8 is a top view of the optical element driving mechanism 1 with the case 10, the frame 50, and the holder 70 omitted. As shown in FIG. 6 to FIG. 8, the AF sensing element 30 is disposed on the corner of the frame 50 close to where the light enters (a light entrance) in this embodiment may be clearly seen. Compared to the situation that the AF sensing element 30 is disposed on the side of the frame 50, such configuration may reduce the volume of the optical element driving mechanism 1 in the plane that is perpendicular to the main axis M. When viewed in a direction that is perpendicular to the main axis M, the first elastic element 20 at least partially overlaps the AF sensing element 30.

In some embodiments, the optical element driving mechanism 1 further includes a plurality of damping elements 180. The damping elements 180 are made of a material that may absorb shock and may inhibit vibration, such as a gel. The damping element 180 may be disposed between the frame 50 and the case 10, in particular, between the AF sensing element 30 and the case 10. Alternatively, the damping element 180 may be disposed between the holder 70 and the frame 50. When the optical element driving mechanism 1 is impacted by an external force, the damping element 180 may prevent a severe collision between the frame 50 and the case 10 or between the holder 70 and the frame 50. Furthermore, the damping element 180 may help the frame 50 and the holder 70 to return to their original positions quickly when they are impacted and may prevent the optical element 2 in the holder 70 from being unstable. Therefore, the damping element 180 may improve the reaction time and the accuracy of the frame 50 and the holder 70 during their movement.

Based on the present disclosure, when the optical element driving mechanism works, the sensing assembly is able to sense the movement of the holder relative to the frame and control the driving assembly to achieve closed-loop feedback. The sensing element disposed on the corner of the frame and the magnetic elements corresponding to the AF coil and the OIS coil at the same time may achieve miniaturization. In addition, the circuit assembly is formed in the frame by insert molding, so that the frame may protect the circuit assembly and the magnetic elements.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
a fixed part;
a movable part moving relative to the fixed part, wherein the movable part comprises:
a frame; and
a holder, wherein the frame and the holder are arranged along a main axis;
a driving assembly driving the movable part to move relative to the fixed part; and
a sensing assembly sensing a movement of the movable part, wherein the sensing assembly comprises:
a sensing element disposed on the frame, wherein the sensing element senses a movement of the holder relative to the frame; and
a reference element disposed on the holder, wherein when viewed along the main axis, the sensing element at least partially overlaps the reference element.

2. The optical element driving mechanism as claimed in claim 1, wherein the holder comprises an electrical connection portion electrically connected to the driving assembly.

3. The optical element driving mechanism as claimed in claim 1, further comprising a damping element disposed between the frame and the fixed part.

4. The optical element driving mechanism as claimed in claim 1, further comprising a damping element disposed between the holder and the frame.

5. The optical element driving mechanism as claimed in claim 1, wherein the fixed part and the sensing element are located a distance apart.

6. The optical element driving mechanism as claimed in claim 1, wherein the fixed part comprises a recess corresponding to the sensing element.

7. The optical element driving mechanism as claimed in claim 1, wherein when viewed along the main axis, a profile of the frame is polygonal and the sensing element is disposed on a corner or a side of the frame.

8. The optical element driving mechanism as claimed in claim 1, further comprising a damping element disposed between the sensing element and the fixed part.

9. The optical element driving mechanism as claimed in claim 1, wherein the sensing assembly further comprises at least another sensing element disposed on the fixed part for sensing a movement of the movable part relative to the fixed part.

10. The optical element driving mechanism as claimed in claim 1, further comprising a stopping assembly close to the sensing element to prevent the sensing element from contacting the fixed part.

11. The optical element driving mechanism as claimed in claim 10, wherein the stopping assembly is disposed on the fixed part or the frame.

12. The optical element driving mechanism as claimed in claim 1, further comprising a plurality of stopping assemblies, wherein the sensing element is disposed between the stopping assemblies.

13. The optical element driving mechanism as claimed in claim 1, wherein the movable part further comprises a circuit assembly disposed on the frame, and a portion of the circuit assembly is revealed from the frame.

14. The optical element driving mechanism as claimed in claim 13, wherein the circuit assembly is three-dimensional.

15. The optical element driving mechanism as claimed in claim 13, wherein the sensing element is electrically connected to the revealed portion of the circuit assembly.

16. The optical element driving mechanism as claimed in claim 13, wherein the movable part further comprises a first elastic element connecting the frame and the holder, and the sensing element is electrically connected to the driving assembly via the first elastic element.

17. The optical element driving mechanism as claimed in claim 16, wherein when viewed in a direction that is perpendicular to the main axis, the first elastic element at least partially overlaps the sensing element.

18. The optical element driving mechanism as claimed in claim 16, wherein the movable part further comprises another elastic element connecting the first elastic element and the holder, the fixed part further comprises an external electrical connection portion, and the sensing element is electrically connected to the external electrical connection portion via the circuit assembly and the another elastic element.

\* \* \* \* \*